United States Patent [19]

Floyd et al.

[11] 4,308,920
[45] Jan. 5, 1982

[54] GROUND WORKING IMPLEMENT WHEREIN FORWARD FRAME PORTION RAISED BEFORE FRAME SUPPORT ENGAGES GROUND

[75] Inventors: Glenn L. Floyd, Findlay; James A. McElwain, Kalida, both of Ohio

[73] Assignee: Remlinger Manufacturing Company, Kalida, Ohio

[21] Appl. No.: 105,189

[22] Filed: Dec. 19, 1979

[51] Int. Cl.³ .................... A01B 19/04; A01B 19/10; A01B 73/00
[52] U.S. Cl. .................................. 172/328; 172/662; 172/688
[58] Field of Search .............. 172/198, 240, 315, 316, 172/326, 327, 328, 391, 396, 413, 615, 620, 680, 687, 688, 689, 456, 662; 280/414.5

[56] References Cited
U.S. PATENT DOCUMENTS

| | | | |
|---|---|---|---|
| 1,384,474 | 7/1921 | Luedke | 172/688 |
| 2,641,886 | 6/1953 | Graham | 172/311 |
| 2,723,129 | 11/1955 | Sprague | 280/414.5 |
| 3,039,633 | 6/1962 | Mindrum et al. | 280/414.5 X |
| 3,063,737 | 11/1962 | Coughran | 280/414.5 |
| 3,319,367 | 5/1967 | Lewis | 172/501 X |
| 3,534,819 | 10/1970 | Grover | 172/316 |
| 3,777,823 | 12/1973 | Holfeld | 172/328 |
| 3,845,730 | 11/1974 | Koronka et al. | 172/413 X |
| 3,897,832 | 8/1975 | Leedahl et al. | 172/311 |
| 3,917,004 | 11/1975 | Finley | 172/328 |

Primary Examiner—Richard T. Stouffer
Attorney, Agent, or Firm—John L. Gray

[57] ABSTRACT

A ground working implement including a frame having a plurality of rows of elements, each element holding a plurality of individual ground working tools extending downwardly. The implement comprises wheels which are used for transporting the ground working assembly which are pivotally connected to the frame and engage the ground midway between the forward and rear portions of the frame so that a tire track is never left in the ground when the implement is operating even if the wheels are touching the ground since ground working tools are positioned behind the tires as well as in front thereof. There is a tongue, adjustable in height, adaptable for connection to a tractor or other suitable motive power, and a selectively reciprocal power source, such as a hydraulic cylinder, for raising and lowering the ground working framework. Upon actuation of the cylinder for raising the frame, the forward end of the frame always rises first so as to permit accumulated trash to feather back through the ground working tools. As the machine rises, the wheels engage the ground and the ground working tool assembly may then be raised completely clear of the ground to a substantially level position for road transportation. Wings may be provided to increase the width of the implement and these may be folded into a vertical position for road transportation.

8 Claims, 5 Drawing Figures

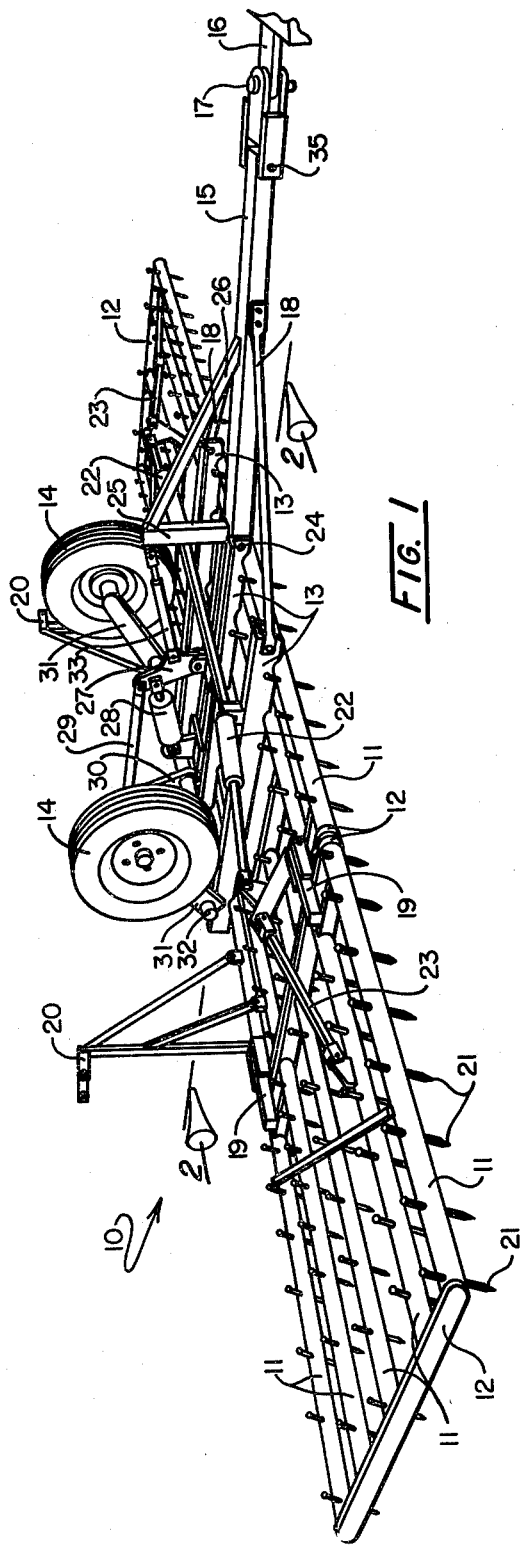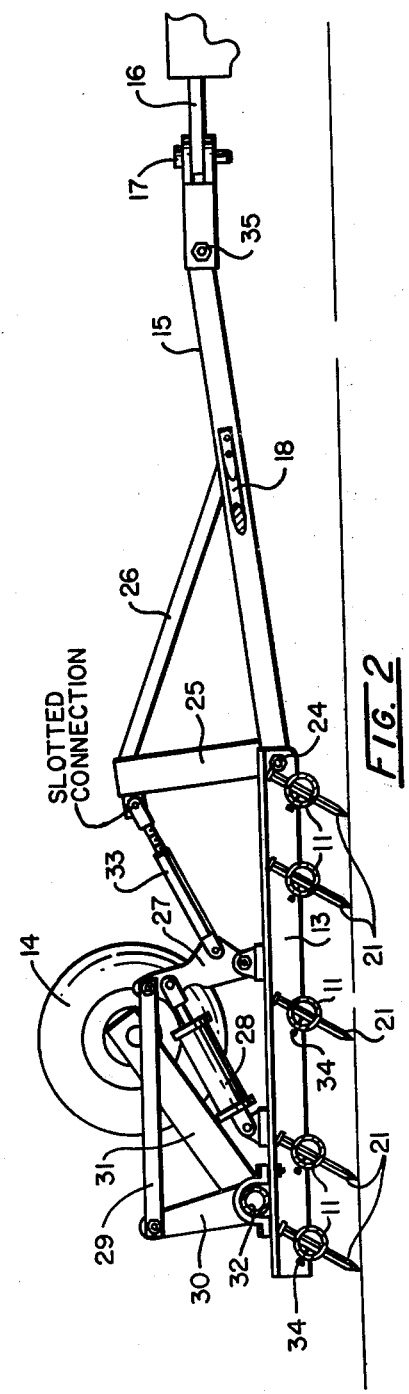

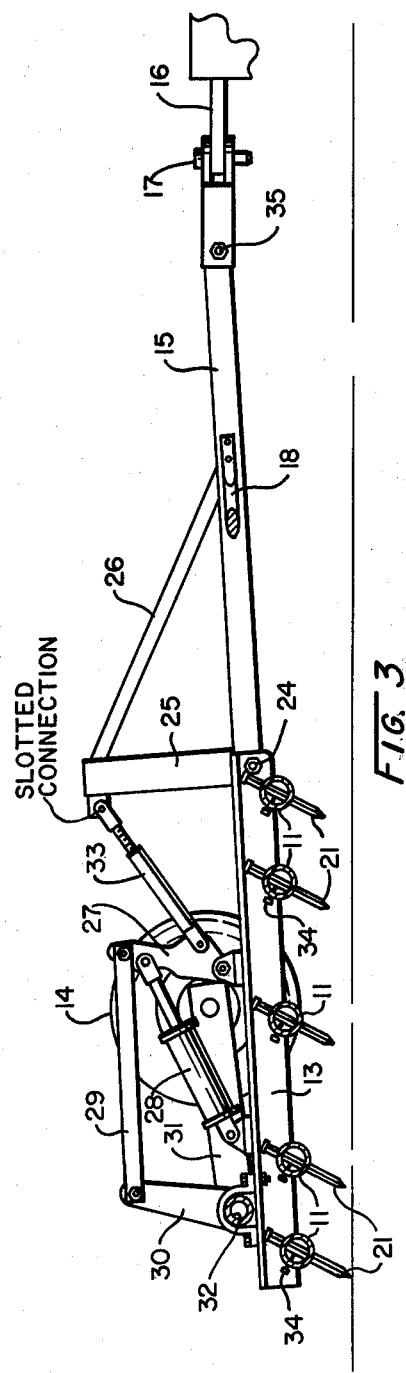
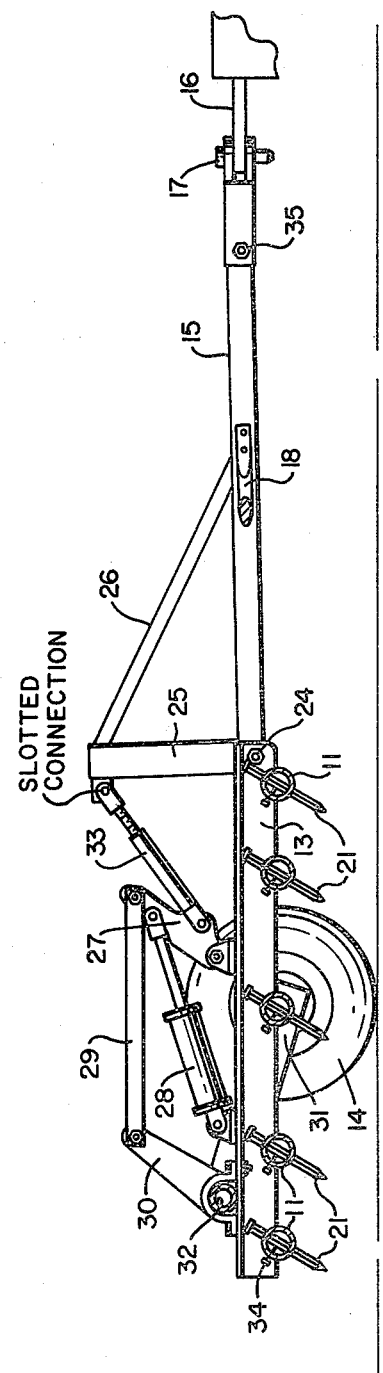

GROUND WORKING IMPLEMENT WHEREIN FORWARD FRAME PORTION RAISED BEFORE FRAME SUPPORT ENGAGES GROUND

SUMMARY OF THE INVENTION

This invention relates to an implement for breaking up soil at the ground surface to provide soil at planting depth of a texture suitable for planting.

The invention is particularly applicable to the class of ground working implements known as "harrows".

In preparing soil for agricultural purposes, it is extremely important that the soil be uniformly worked and that there not be tire tracks therein from the implement performing the soil preparation function. The depressions created by such tire tracks cause uneven distribution of moisture and caking of the soil which reduces crop production and encourages growth of weeds. It is also important that during the soil preparation procedure that it be possible for the tractor operator while sitting on the tractor temporarily to raise the forward end of the soil working implement so as to permit accumulated trash and debris to feather back through the ground working implement and not build up at the forward end thereof. It is desirable to be able to raise the forward end of the ground working implement in order to accomplish this without engaging the wheels with the ground. Attempts to accomplish these desirable objectives in the prior art have resulted in wheel pressure and consequent tracks on the previously prepared soil. An example of this is shown in U.S. Pat. No. 3,534,819, Grover.

Since the height of tractor hitches varies among tractors, it is also desirable to be able to modify the height of the hitch and tongue assembly of the machine constituting the invention so that it can be readily attached to any tractor yet still be in an essentially level mode for transportation when the wheels are engaged with the ground.

The instant invention is therefore directed to a ground working implement known as a "harrow" which avoids the objectionable results discussed above and provides in a single device all of the elements necessary to provide the desirable results above set forth.

An object of this invention, therefore, is to provide a ground working implement which is capable of preparing soil for agricultural purposes in a uniform manner and not leave tire tracks therein from the implement performing the soil preparation function.

Another object of this invention is to provide a ground working implement whose forward end may be raised temporarily by the tractor operator while riding on the tractor so as to permit accumulated trash and debris to feather back through the ground working tools and not build up at the forward end thereof.

Another object of this invention is to provide a ground working implement which may be adjusted so that its tongue will then attach to tractors of varying hitch heights and will still result in a substantially level positioning of the ground working implement while in a transporting mode.

This, together with other objects and advantages of the invention should become apparent in the details of construction and operation as more fully described hereinafter and claimed, reference being had to the accompanying drawings forming a part hereof wherein like numerals refer to like parts throughout.

BRIEF DESCRIPTION OF THE DRAWINGS

FIG. 1 is a perspective view of the ground working implement constituting this invention in an operating position with the wheels fully retracted. The hydraulic pressure lines to the various operating cylinders have been omitted for purposes of clarity in describing the invention.

FIG. 2 is a side elevation view of the ground working implement on the section line 2—2 of FIG. 1.

FIG. 3 is a side elevation view of the ground working implement on the section line 2—2 of FIG. 1 but with the front end of the implement slightly raised so that debris and trash may be feathered back through the ground working tools.

FIG. 4 is a side elevation view of the ground working implement on the section line 2—2 of FIG. 1 but with the tool holding frame completely raised and the wheel completely extended and supporting the implement a distance from the ground.

DETAILED DESCRIPTION OF THE INVENTION

Figure 5:
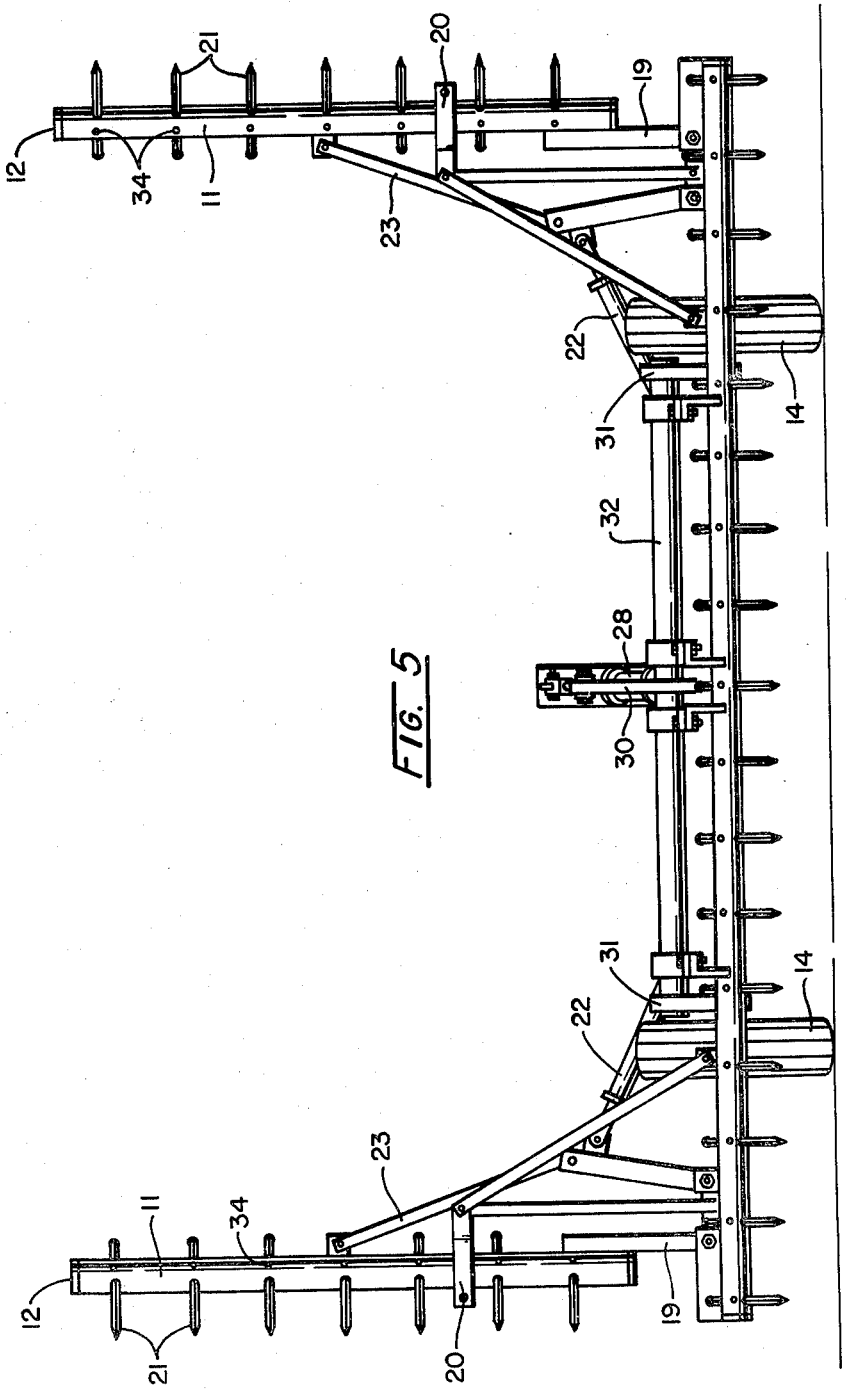
FIG. 5 is a rear elevation view of the ground working implement with the wings raised for transportation, such as on a road.

Referring now more particularly to the drawings and to FIG. 1, applicant's invention comprises a frame shown generally at 10 which is made up of a plurality of tubular pieces 11—11, firmly connected at their ends to frame pieces 12—12. Three frame members 13—13, extending across and connecting to tubular members 11—11, support the ground engaging wheels 14—14, which are located within the frame and which are used to support the implement in a transportation mode. The center frame member 13 is also connected to the tongue 15 which in turn is connected to the tractor hitch 16 and held by the usual pin 17. Reinforcing members 18—18 are connected to the tongue and to outer frame members 13—13 to provide lateral support for the tongue. Wing members may be provided and also comprise tubular members 11—11 and end frame pieces 12—12 rigidly connected thereto and are hinged at 19—19 so that the wing members may be folded into a vertical position and attached to supports 20—20 for road transportation. The wing portions may be raised to a vertical position by means of the hydraulic cylinders 22—22 attached to lever arms 23—23 and are operated through hydraulic hoses (not shown) directly connected to the tractor.

Earthworking teeth 21—21 extend through the tubular members 11—11 at an approximately 26° angle from the vertical and point toward the rear of the implement. The tubular members 11—11 provide greater strength and slide over the ground easily in operation. They also provide two points of support for teeth 21—21.

The tongue 15 is pivotally connected to central frame member 13 at fulcrum 24 and is provided with an upright arm 25 which is rigidly connected to the tongue by means of member 26 approximately midway of the length of the tongue 15. A lever arm 27 is pivotally connected to middle frame member 13 between its forward and rear ends and one end of a selectively reciprocable power source 28 such as a hydraulic cylinder, is connected to middle frame member 13 between the rear end of said frame member 13 and the point of attachment to the frame member 13 of the lever arm 27.

Selectively reciprocable power source 28 is connected by the usual hydraulic hosing to the tractor from which it may be operated. However, for purposes of clarity in the drawings, such hoses are not shown. The upper end of lever arm 27 has pivotally connected to the upper end thereof a connecting link 29. The rear end of the connecting link 29 is pivotally connected to the upright arm 30 of a rear bell crank lever comprising this upright arm 30 and two forwardly extending arms 31—31 on the forward end of each of which a wheel 14 is rotatably attached. The fulcrum of this bell crank lever is pivotally attached to all three frame members 13—13 at fulcrum 32. Arms 30 and 31 may be better seen in FIG. 2.

Referring now more particularly to FIG. 2, an adjustable link 33 is pivotally connected at its forward end to the upper end of upright arm 25. The rear end of the adjustable link 33 is pivotally connected to lever arm 27 between the pivotal connections of lever arm 27 to middle frame member 13 and selectively reciprocable power source 28, preferably forward of a line drawn between the pivot point connection of lever arm 27 to middle frame member 13 and the pivot point connection of selectively reciprocable power source 28 to lever arm 27. Either end of adjustable link 33, if desired, may be connected by means to provide some relative movement between adjustable link 33 and either lever arm 27 or upright arm 25, or both. This may be accomplished by having the pivotal connection comprise a slotted connection, for example. The purpose of such a connection which provides relative movement is to compensate for slight differences in the height of the ground on which the tractor might be located compared with the ground on which the ground working implement is located. Teeth 21—21 are fastened in tubular members 11—11 by means of set screws 34—34 or other suitable means so that the teeth may be adjusted in height and removed for sharpening or repair.

In FIG. 2 the implement is shown positioned on the ground in its working mode. The surface of the ground is shown as being hard and therefore the teeth 21—21 have not penetrated the surface of the ground but in normal operation as the implement is pulled through previously agitated soil the lower ends of teeth 21—21 would be below the level of the ground and the tubular members would be at approximately the surface of the ground. It will be noted that in this mode the wheels 14—14 are completely raised and out of contact with the soil being worked.

Referring now more particularly to FIG. 3, it will be noted that the selectively reciprocable power source 28 has been actuated by means of the hydraulic hoses connected to the tractor (not shown) to such an extent so as slightly to raise the forward end of the implement so as to permit accumulated trash and debris at the forward end of the implement to feather back through the teeth 21—21. With tongue 15 pivotally connected at 35 near the tractor hitch 16 and with the forward thrust of piston 28 moving upstanding lever arm 27 forward, this causes adjustable link 33 to move forward and since the frame members 13—13 are rigid and the tongue 15 is rigid and they are pivotally connected at point 24, the forward teeth 21—21 on the tubular members 11—11 connected to the frame members 13—13 are forced upward even though the wheels 14—14 are not in contact with the surface of the ground. Thus, the forward end of frame members 13—13 may be raised approximately two to three inches from the ground, while the tubular members 11—11 connected to the rear of the frame members 13—13 having the tools 21—21 attached thereto still working the soil. If the wheels 14—14 come in contact with the surface of the ground as the forward end of the frame members 13—13 are raised, a wheel track is not left in the ground since the ground working teeth 21—21 at the rear of the frame will obliterate any such track.

Referring now more particularly to FIG. 4, it will be seen that as force from selectively reciprocable power source 28 continues to be applied to lever arm 27, it will continue to be pushed forward at its upper end and through connecting link 29 and bell crank arms 30 and 31, wheels 14—14 will be continued to be forced downward toward the ground thereby lifting the rear of frame members 13—13. However, since adjustable link 33 is preferably connected to lever arm 27 forward of a line between the pivotal connection of selectively reciprocable power source 28 to lever arm 27 and the pivotal connection of lever arm 27 to the middle frame member 13, pressure will no longer continue to be exerted by adjustable link 33 at the upper end of upright arm 25. Therefore, the rear end of frame members 13—13 will tend to rise and the front of frame members 13—13 will not be forced upwardly, thus permitting frame members 13—13 to assume a generally horizontal position as wheels 14—14 are moved downwardly against the ground.

Thus, though trailer hitch heights may vary from approximately 12 inches to approximately 24 inches, by varying the length of adjustable link 33 approximately two inches, depending upon the trailer hitch height, the frame members 13—13 will assume a generally horizontal position for ground working and transportation purposes yet be capable of having the forward ends thereof temporarily raised approximately two to three inches by the tractor operator while driving the tractor during ground working operations.

In operation the hydraulic lines are hooked to the trailer and the implement is actuated so that it achieves the position in FIG. 2. Adjustable link 33 is then temporarily disconnected from upright arm 25 and tongue 15 is connected to trailer hitch 16 and pin 17 is inserted. The length of adjustable link 33 is then adjusted until it may be again pivotally connected to upright arm 25. The hydraulic valve on the tractor may then be actuated causing wheels 14—14 to be moved downwardly as selectively reciprocable power source 28 is actuated, thus lifting the frame members 13—13 off the ground into a transportation mode.

Referring now more particularly to FIG. 5, this view shows a rear view of the implement with the wings raised and locked in an upright vertical position and the frame raised off the ground for transportation in a non-working mode.

This view more clearly shows that fulcrum 32 is in reality an axle connected at its midpoint to upright arm 30 of the rear bell crank and at either end to forwardly extending arms 31—31. In operation, the implement is transported to the field which is to be worked, the wings are placed in a horizontal position by means of actuation of hydraulic cylinders 22—22, then selectively reciprocable power source 28 is actuated lowering the entire assemblage and causing wheels 14—14 to be raised.

The implement is then dragged through the soil and if debris should accumulate at the forward end thereof, selectively reciprocable power source 28 may be actuated temporarily so that the implement assumes the position shown in FIG. 3 with the forward end of frame members 13—13 raised approximately two to three inches and the tools 21—21 associated there correspondingly raised while the tools 21—21 at the rear end of frame members 13—13 are still engaged in the soil. After the debris has feathered through the implement the forward end of the implement is lowered into ground engaging position. All of this, of course, can be accomplished while the tractor and the implement are moving forward and the operator has remained on the tractor seat.

While this invention has been described in its preferred embodiment, it is appreciated that variations thereon may be made without departing from the proper scope and spirit of the invention.

What is claimed is:

1. A ground working implement comprising:
   a frame carrying downwardly extending ground working means;
   support means for said frame;
   an upright lever arm pivotally connected to said frame between its forward and rear ends;
   an adjustable link pivotally connected to the lower portion of said upright lever arm above the point of attachment of said upright lever arm to said frame and extending upwardly and forwardly;
   a forward bell crank lever means having a forwardly extending arm adapted to be pivotally connected to a motive means, a fulcrum pivotally connected to a forward portion of said frame, and an upright arm of said forward bell crank lever means having an upper end pivotally connected to the upwardly and forwardly extending end of said adjustable link;
   a selectively reciprocable power source connected at one end to said frame between the rear end of said frame and the point of attachment to said frame of said upright lever arm, and being pivotally connected at said other end to said upright lever arm between the point of attachment of said adjustable link to said upright lever arm and the upper end of said upright lever arm;
   a rear bell crank lever means having a forwardly extending arm with a forward end connected to said support means for said frame, a fulcrum pivotally connected to a rear portion of said frame; and an upright arm of said rear bell crank lever means;
   and a connecting link pivotally connected at its rear end to the upper end of said upright arm of said rear bell crank lever means and pivotally connected at its forward end to the upper end of said upright lever arm, said connecting link being of such length and the arms of said rear bell crank lever means being so relatively angularly positioned that upon actuation of said selectively reciprocal power source so as to cause forward motion of the upper portion of said upright lever arm the subsequent raising of the forward portion of said frame will occur prior to engagement of said support means for said frame with the ground.

2. The implement of claim 1 wherein said adjustable link is pivotally connected to said upright lever arm forward of a line between the pivotal connection of said lever arm to said frame and the pivotal connection of said selectively reciprocal power source to said upright lever arm.

3. The implement of claim 2 wherein said support means for said frame comprises wheels.

4. The implement of claim 3 wherein said wheels are positioned within said frame.

5. The implement of claim 2 wherein said frame comprises horizontally disposed tubular members.

6. The implement of claim 5 wherein said ground working means comprise teeth which extend entirely through said tubular members.

7. The implement of claim 2 wherein said selectively reciprocal power source may be actuated from said motive means.

8. The implement of claim 1 wherein at least one end of said adjustable link is provided with means to provide slight relative movement with respect to the member to which it is pivotally connected.

* * * * *